United States Patent
Wu et al.

(10) Patent No.: US 8,339,783 B2
(45) Date of Patent: Dec. 25, 2012

(54) SLIDE AND TILT MECHANISM FOR ELECTRONIC DEVICE

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 213 days.

(21) Appl. No.: 12/825,481

(22) Filed: Jun. 29, 2010

(65) Prior Publication Data

US 2011/0176261 A1      Jul. 21, 2011

(30) Foreign Application Priority Data

Jan. 15, 2010   (CN) .......................... 2010 1 0300325

(51) Int. Cl.
*H05K 7/16* (2006.01)

(52) U.S. Cl. .............. 361/679.56; 361/679.01; 361/727; 455/575.4

(58) Field of Classification Search ............. 361/679.01, 361/679.02, 679.08, 679.09, 679.55–679.56, 361/679.21, 679.26, 679.27; 248/917–924; 455/575.1–575.4
See application file for complete search history.

(56) References Cited

U.S. PATENT DOCUMENTS

| | | | | |
|---|---|---|---|---|
| 8,032,192 | B2 * | 10/2011 | Park .......................... | 455/575.4 |
| 2008/0161075 | A1 * | 7/2008 | Kim et al. .................. | 455/575.4 |
| 2008/0174942 | A1 * | 7/2008 | Yang et al. .................... | 361/680 |
| 2011/0003624 | A1 * | 1/2011 | Jung et al. .................. | 455/575.4 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An electronic device includes a first housing, a second housing covering the first housing, a slide mechanism, a hinge bar, and a resilient element. The slide mechanism slidably connects to the first housing to the second housing. A first end of the hinge bar rotatably connects to the slide mechanism, a second end of the hinge bar rotatably and slidably connects to the first housing. The resilient element is fixed on the slide mechanism and the hinge bar. When the second housing overlaps the first housing, the resilient element is compressed to generate an elastic potential energy by the hinge bar and the slide mechanism; when the second housing is open relative to the second housing, the elastic potential energy drives the hinge bar to tilt relative to the slide mechanism and supports the second housing.

15 Claims, 7 Drawing Sheets

SLIDE AND TILT MECHANISM FOR ELECTRONIC DEVICE

BACKGROUND

1. Technical Field

The present disclosure generally relates to electronic devices, and particularly to a slide and tilt mechanism for an electronic device.

2. Description of Related Art

Portable electronic devices such as mobile phones, laptops, and personal digital assistants (PDAs) are widely used. Slide-type portable electronic devices have been increasingly used. A slide-type portable electronic device has two housings, of which one slides relative to the other by a slide mechanism to open/close the portable electronic device.

However, the slide-type portable electronic devices typically only allow the two housings to slide parallel to each other. Therefore, when the slide-type portable electronic device is positioned horizontally, it can be difficult for users to view a display screen disposed on the housing.

Therefore, there is room for improvement within the art.

BRIEF DESCRIPTION OF THE DRAWINGS

Many aspects of the slide and tilt mechanism for electronic device can be better understood with reference to the following drawings. The components in the drawings are not necessarily to scale, the emphasis instead being placed upon clearly illustrating the slide and tilt mechanism for electronic device. Moreover, in the drawings, like reference numerals designate corresponding parts throughout the several views.

DETAILED DESCRIPTION

Figure 1:
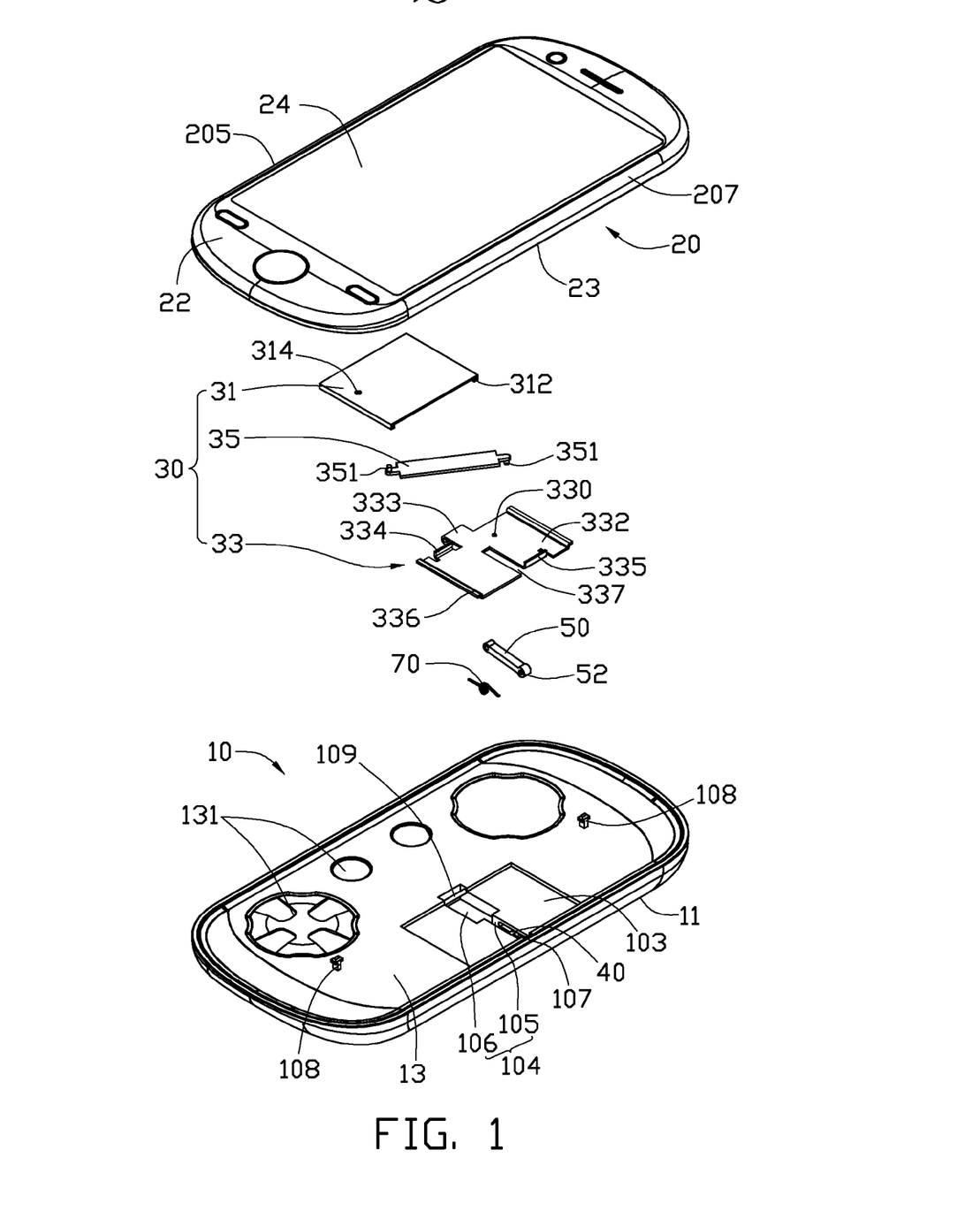
FIG. 1 is an exploded, isometric view of an electronic device according to an exemplary embodiment.
Figure 2:
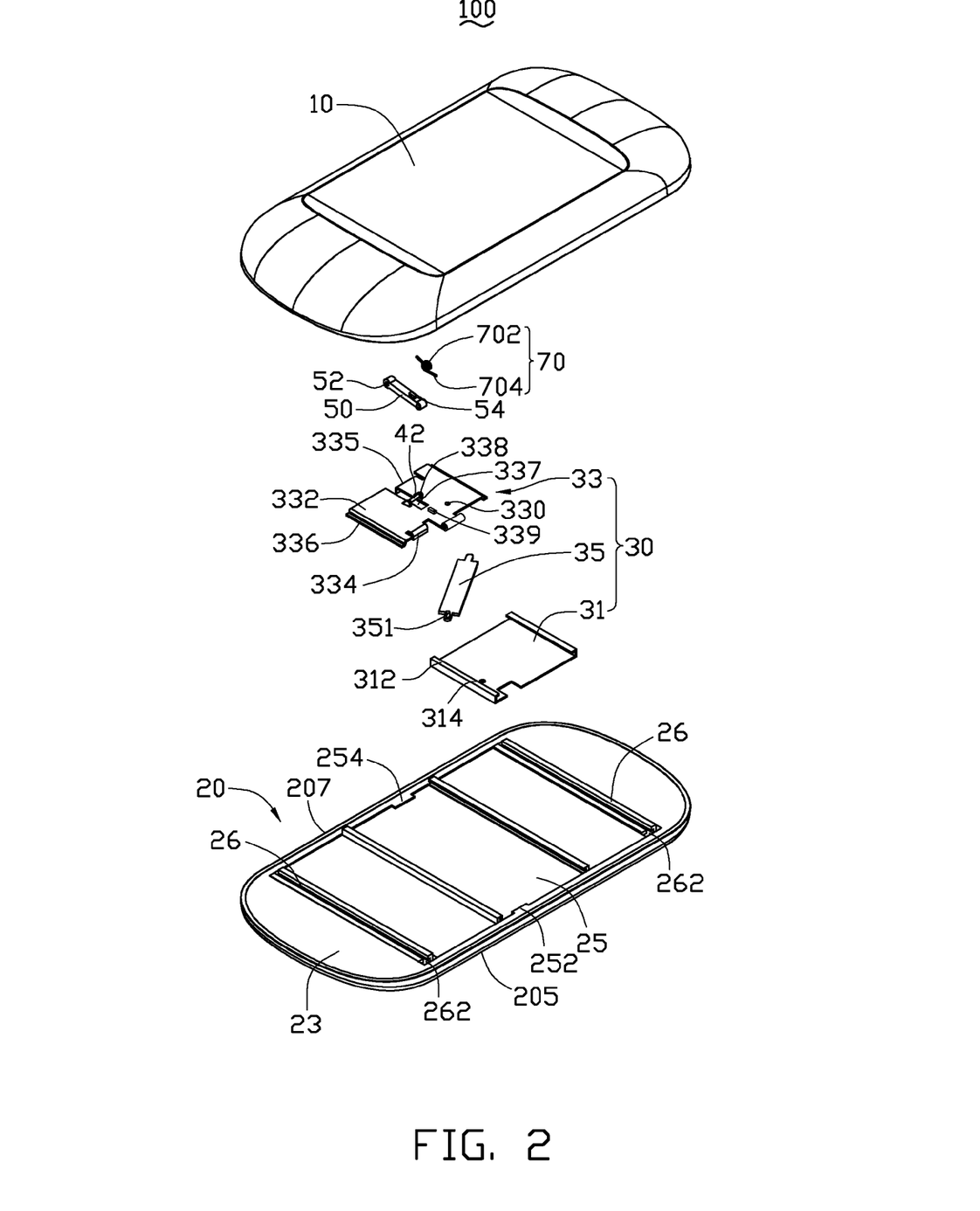
FIG. 2 is similar to FIG. 1, but shown from another angle.
Figure 7:
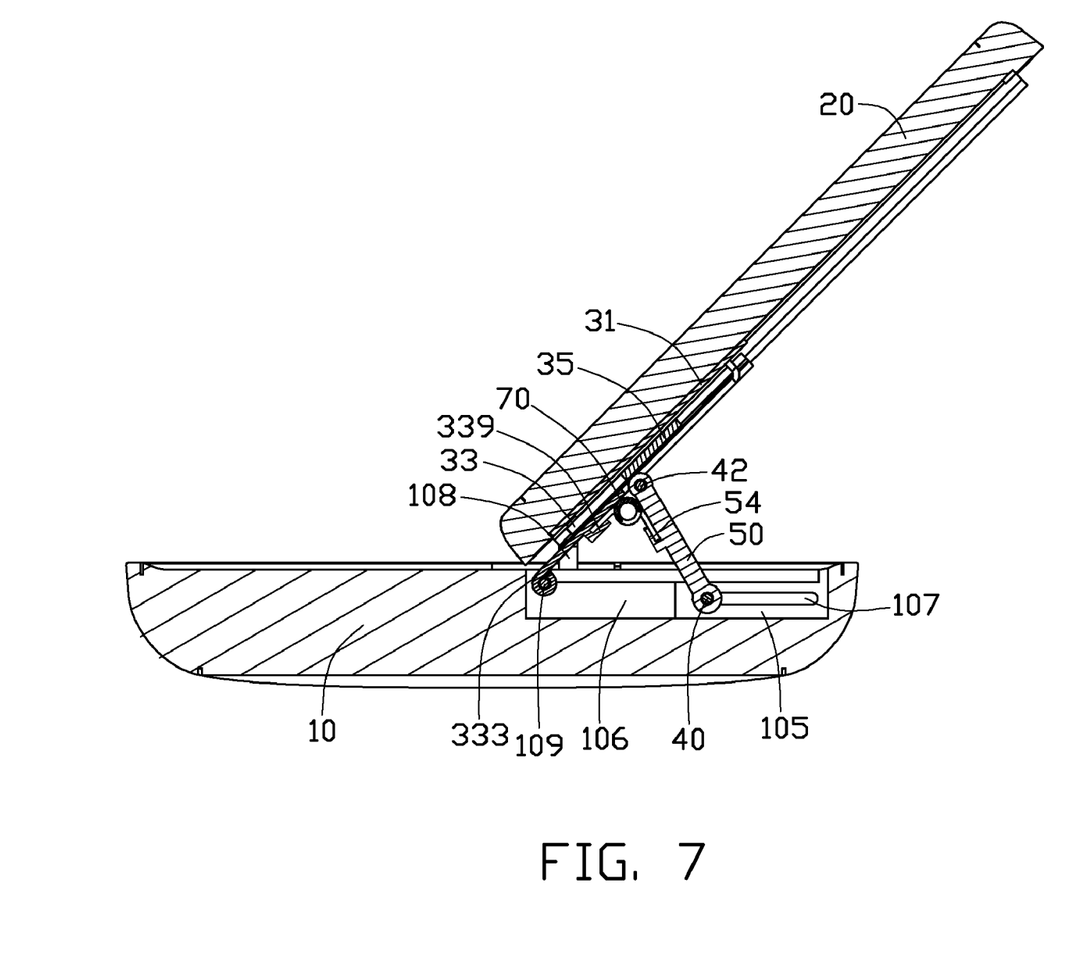
FIG. 7 is a cross-sectional view of the housing taken along line VII-VII of FIG. 5 in an open state.

FIGS. 1 and 2 show an exemplary embodiment of an electronic device 100, such as a mobile phone, or a personal digital assistant. The electronic device 100 can be in a closed state (FIG. 3) and an open state (FIG. 7). The electronic device 100 includes a first housing 10, a second housing 20, a slide mechanism 30, a hinge bar 50, and a resilient element 70. In the closed state, the first housing 10 and the second housing 20 overlap each other. In a tilted state, the second housing 20 may be angularly adjusted relative to the first housing 10 for better viewing.

The first housing 10 includes a first surface 11 and an opposite second surface 13 which faces the second housing 20 when the electronic device 100 is in the closed state. The second surface 13 includes a plurality of keys 131 and two positioning blocks 108. The keys 131 are configured to carry out functions, such as telephony or PDA functions. The keys 131 are visible and accessible when the electronic device 100 is in the open state. The second surface 13 further defines a slot 103 for receiving the slide mechanism 30. A receiving chamber 104 is defined in a bottom surface of the slot 103 along a transverse direction thereof. The receiving chamber 104 includes a first receiving chamber 105 and a second receiving chamber 106 communicating with the first receiving chamber 105. The second receiving chamber 106 is wider than the first receiving chamber 105. Two opposite inner walls of the first receiving chamber 105 cooperatively define a notch 107. A removable first shaft 40 is slidably received in the notch 107, and is configured for connecting the hinge bar 50. A removable positioning post 109 (FIG. 4) is positioned in the second receiving chamber 106, and is configured for rotatably connecting the slide mechanism 30. The positioning blocks 108 are substantially T-shaped, and symmetrically positioned at two sides of the slot 103. The positioning blocks 108 are configured for locking the second housing 20 on the first housing 10. Thus, the electronic device 100 can be in the closed state.

The second housing 20 includes a first surface 22, an opposite second surface 23, a first edge 205, and an opposite second edge 207. The first surface 22 includes a display screen 24 positioned thereon. The second surface 23 faces the second surface 13 of the first housing 10 when the electronic device 100 is in the closed state. The second surface 23 defines a receiving slot 25 and two guiding slots 26 disposed at two sides of the receiving slot 25. The receiving slot 25 is configured for receiving the slide mechanism 30. A first protrusion 252 and a second protrusion 254 respectively extend into the receiving slot 25 from the first edge 205 and the second edge 207. Each of the guiding slots 26 is substantially T-shaped and can receive a corresponding positioning block 108. Each of the guiding slots 26 defines an opening end 262. The positioning blocks 108 can slide in/out the guiding slots 26 through the opening ends 262.

The slide mechanism 30 includes a fixed plate 31, a sliding plate 33, and a connecting plate 35. The fixed plate 31 can be fixed in the receiving slot 25, and defines two sliding slots 312 at two opposite ends thereof and a first through hole 314. The sliding plate 33 includes a base 332 and a hinged portion 333. The base 332 defines a second through hole 330 and an opening 337 therein. The opening 337 penetrates an end of the base 332. The base 332 further includes a first resisting portion 334, a second resisting portion 335, two guiding rails 336, two protruding blocks 338, and a first fixed portion 339. The first resisting portion 334 and the second resisting portion 335 are positioned at two opposite ends of the base 332 for resisting the first protrusion 252 and the second protrusion 254. The guiding rails 336 are formed at the other two opposite ends of the base 332 for slidably matching in the sliding slots 312. The protruding blocks 338 are symmetrically positioned at the base 332 adjacent to two sides of the opening 337. A removable second shaft 42 spans the opening 337, and two ends of the second shaft 42 are fixed to the protruding blocks 338 for rotatably connecting the hinge bar 50. The first fixed portion 339 is secured on the base 332 and aligns with the opening 337. The first fixed portion 339 is configured for securing the resilient element 70. The hinged portion 333 extends from one end of the base 332 away from the opening 337, and is configured for rotatably connecting the positioning post 109. The connecting plate 35 is assembled between the fixed plate 31 and the sliding plate 33. Two pins 351 are positioned on two ends of the connecting plate 35. The pins 351 can be inserted in the first through hole 314 and the second through hole 330 for connecting the sliding plate 33 and fixed plate 31. Thus, the connecting plate 35 can limit the sliding distance of the sliding plate 33 relative to the fixed plate 31.

The hinge bar 50 defines two positioning holes 52 at two ends thereof. An end of the hinge bar 50 rotatably connects the second shaft 42. The other end of the hinge bar 50 connects the first shaft 40 in the notch 107. The hinge bar 50 includes a second fixed portion 54 positioned thereon. The second fixed portion 54 defines a hole 542 (FIG. 4) for securing the resilient element 70.

The resilient element 70 is a torsion spring including a coiled portion 702 and two connecting portions 704 extending from two ends of the coiled portion 702. In an original relaxed state, the two connecting portions 704 define an acute angle therebetween. The two connecting portions 704 can be respectively secured to the first fixed portion 339 and the second fixed portion 54.

Figure 3:
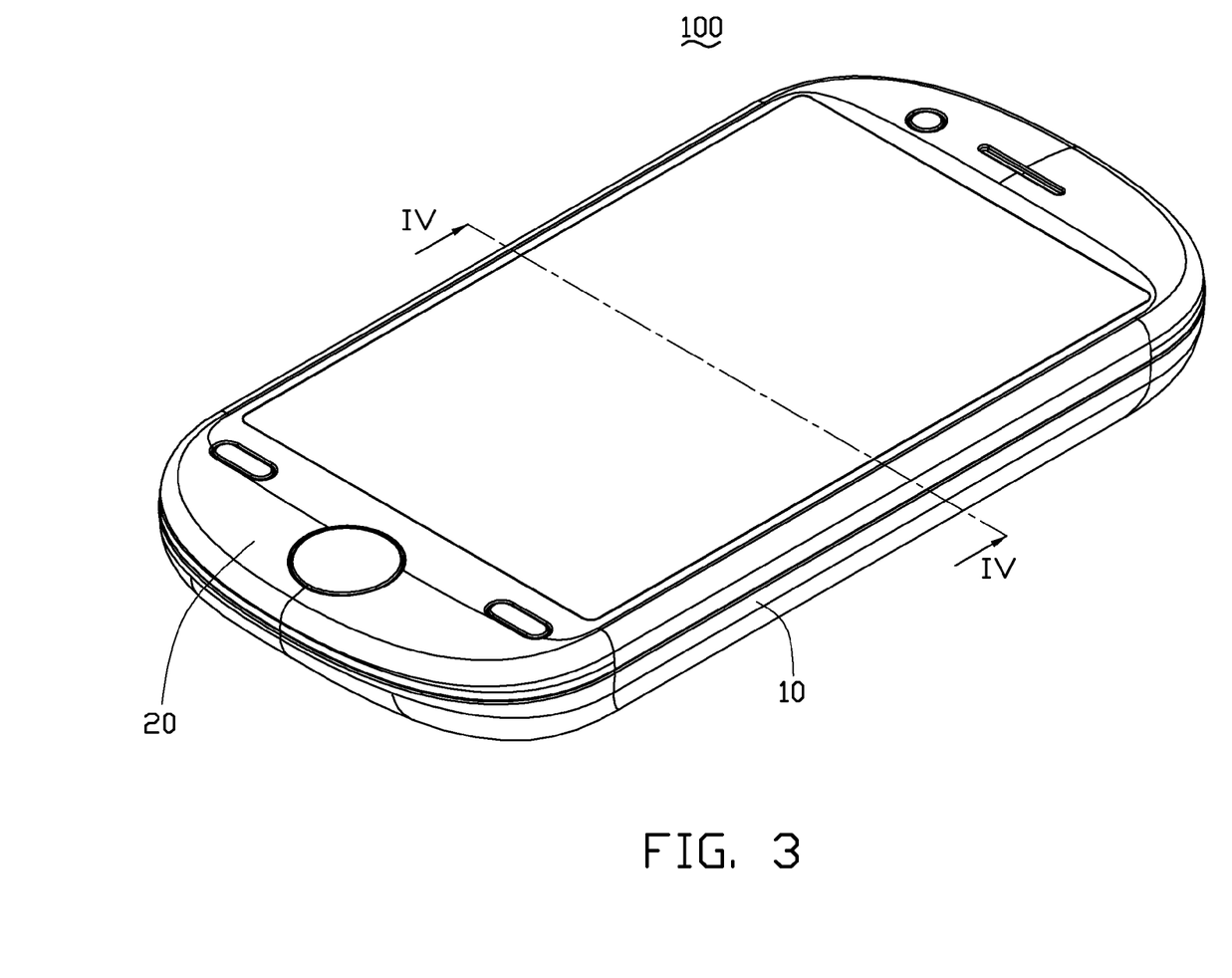
FIG. 3 is an assembled isometric view of the electronic device of FIG. 1 in a closed state.
Figure 4:
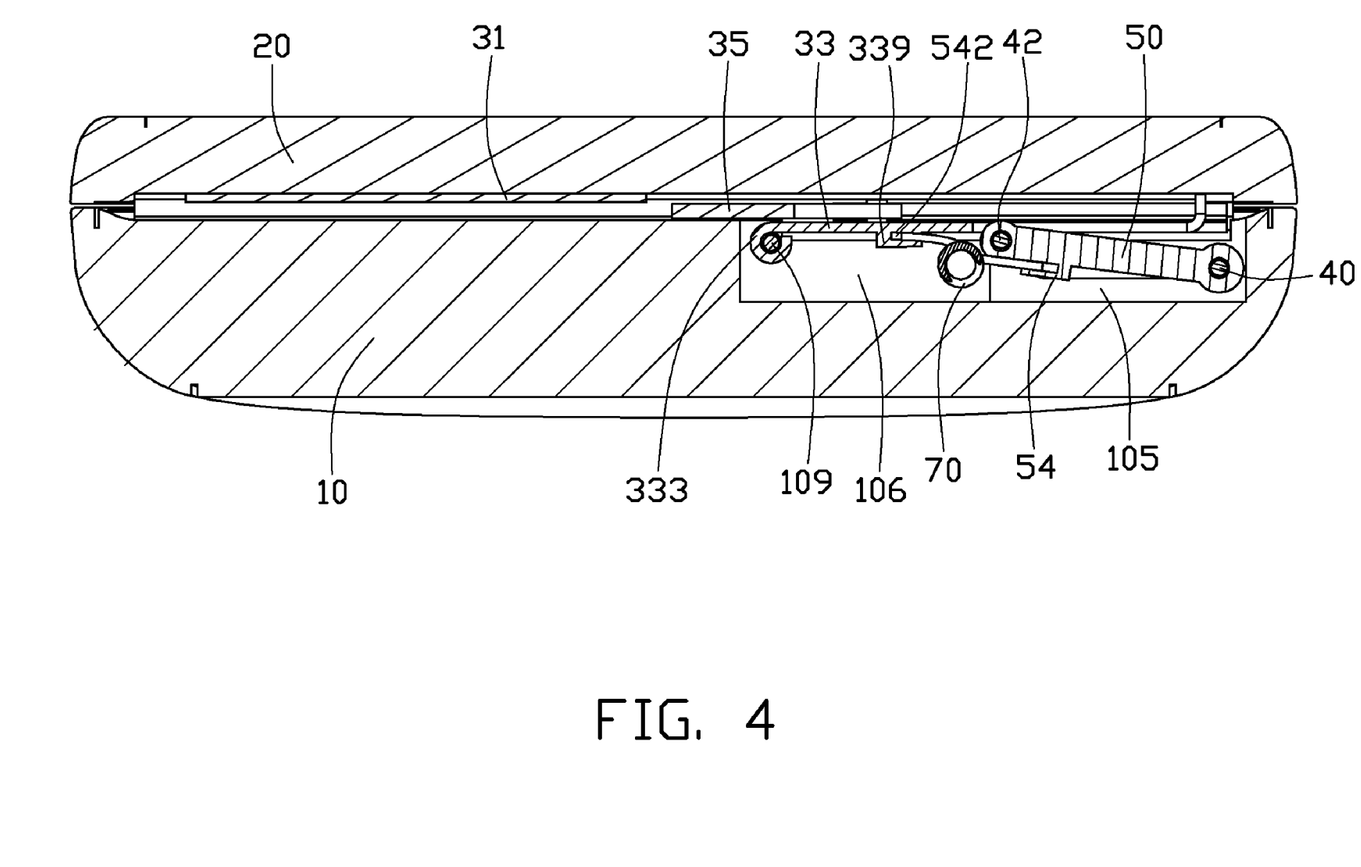
FIG. 4 is a cross-sectional view of the housing taken along line IV-IV of FIG. 3.

Referring to the FIGS. 3 and 4, in assembly, the fixed plate 31 is fixed in the receiving slot 25, thus the sliding plate 33 can slide relative to the second housing 20. The positioning post 109 is inserted into the hinged portion 333, and two ends of the positioning post 109 are fixed in the second receiving chamber 106. The first shaft 40 and the second shaft 42 are respectively inserted into the two positioning holes 52. Two ends of the first shaft 40 are slidably spanned between the notch 107, and two ends of the second shaft 42 are spanned between the protruding blocks 338. Two connecting portions 704 are respectively secured to the first fixed portion 339 and the second fixed portion 54.

When the electronic device 100 is to be folded, the second housing 20 covers the first housing 10, and the keys 131 are protected by the second housing 20. The sliding plate 33 is open relative to the fixed plate 31. The second resisting portion 335 resists the second protrusion 254, and the positioning blocks 108 are received in the guiding slots 26. The sliding plate 33 and the hinge bar 50 define an obtuse angle about 180 degrees. The spiral portion 702 is compressed by the hinge bar 50 and the sliding plate 33 to generate an elastic potential energy.

Figure 5:
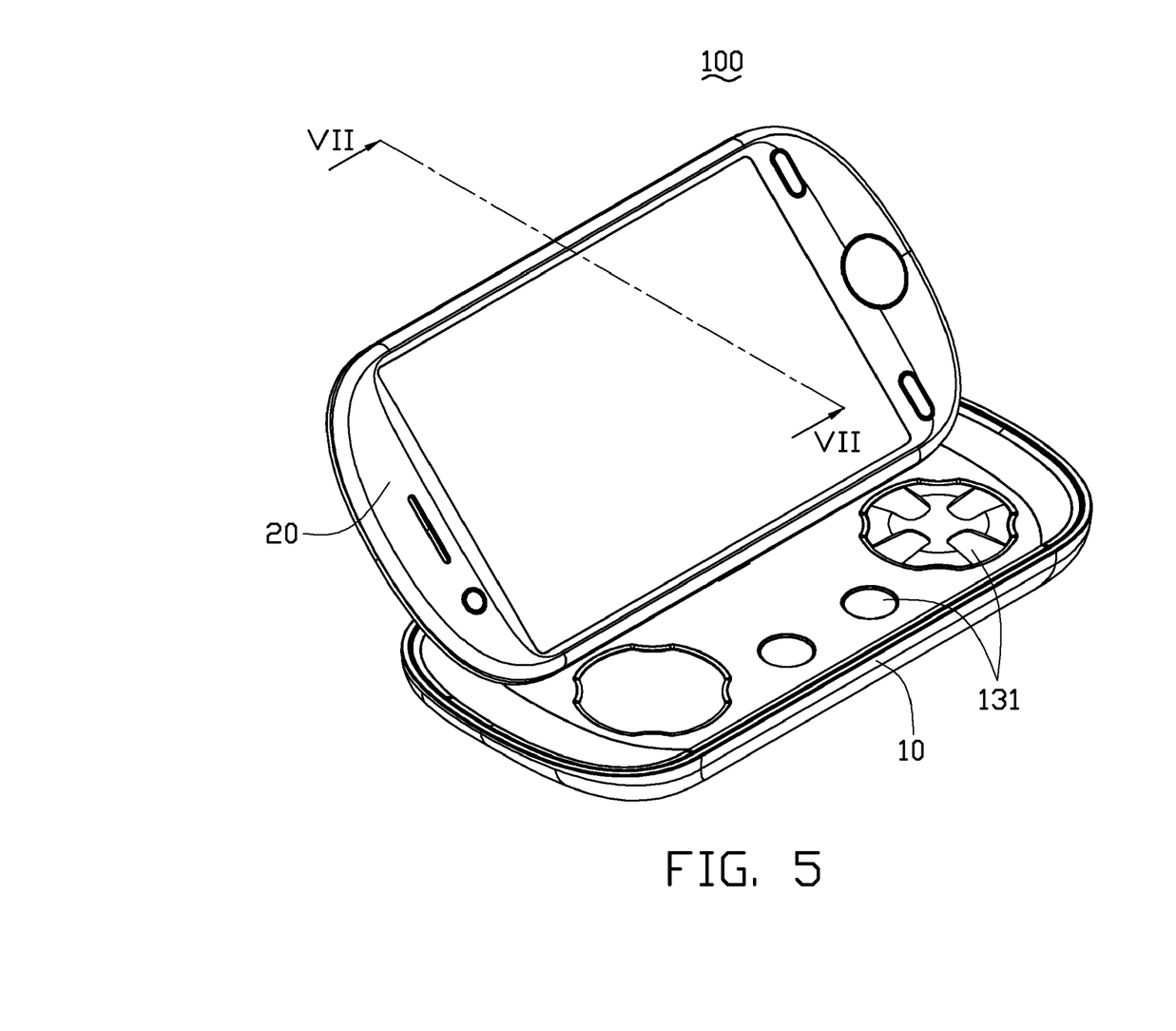
FIG. 5 is an isometric view of the electronic device of FIG. 3 in an open state.
Figure 6:
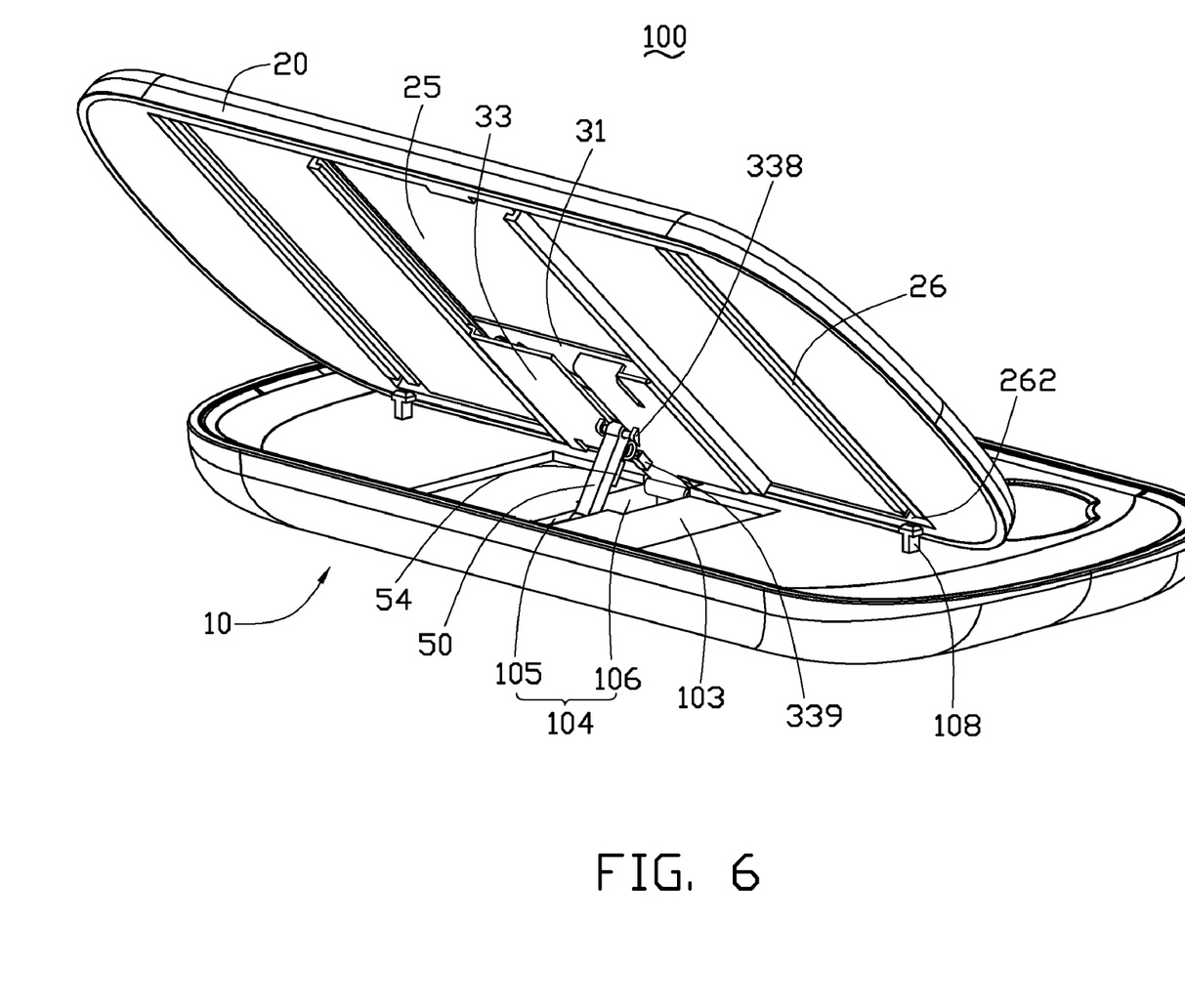
FIG. 6 is similar to FIG. 5, but shown from another angle.

Referring to the FIGS. 5 to 7, when the electronic device 100 is to be opened, an external force is applied to the second housing 20 while the first housing 10 is kept stationary. The external force pushes the second housing 20 to slide away from the first housing 10. The positioning blocks 108 slide in the guiding slots 26. The second resisting portion 335 resists the second protrusion 254, thus when the second housing 20 slides relative to the first housing 10, the sliding plate 33 keeps stationary relative to the second housing 20. The fixed plate 31 slides on the sliding plate 33 by the second housing 20. When the first resisting portion 334 resists the first protrusion 252, the slide mechanism 30 is completely closed. At the same time, the positioning blocks 108 are released from the guiding slots 26 through the opening end 262. Then, the external force is removed. The resilient element 70 releases the potential energy from the elastic allowing it to return to the original relaxed state, and the obtuse angle gradually reduces. Thus, one end of the hinge bar 50 slides in the notch 107 and rotates relative to the first shaft 40, the other end of the hinge bar 50 rotates relative to the second shaft 42. Meanwhile, the hinged portion 333 rotates relative to the positioning post 109. The first edge 205 slides on the first housing 10 to expose the keys 131, and the second edge 207 is tilted above the first housing 10 by hinge bar 50. When the resilient element 70 fully returns to the original relaxed state, the hinge bar 50 and the slide mechanism 30 support the second housing 20, thus, the electronic device 100 is completely open.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a first housing comprising at least one positioning block;
a second housing defining at least one guiding slot, the at least one positioning block slidably received in the at least one guiding slot;
a slide mechanism slidably attaching the first housing to the second housing, the slide mechanism comprising a fixed plate and a sliding plate sliding on the fixed plate, the fixed plate fixed on the second housing;
a hinge bar, a first end of the hinge bar rotatably connecting to the sliding plate of the slide mechanism, a second end of the hinge bar movably connecting to the first housing; and
a resilient element, two ends of the resilient element fixed on the slide mechanism and the hinge bar;
wherein when the second housing overlaps the first housing, the resilient element is compressed to generate an elastic potential energy by the hinge bar and the slide mechanism; when the second housing is open relative to the second housing, the elastic potential energy drives the hinge bar tilted relative to the slide mechanism and supports the second housing.

2. The electronic device as claimed in claim 1, wherein the sliding plate comprises a first resisting portion and a second resisting portion positioned at two opposite ends thereof for resisting the second housing; when the electronic device is closed, the sliding plate is open relative to the fixed plate, the second resisting portion resists a side of the second housing.

3. The electronic device as claimed in claim 1, wherein the first housing comprises a positioning post, the sliding plate comprises a hinged portion rotatably connecting the positioning post.

4. The electronic device as claimed in claim 1, wherein the first housing defines a first receiving chamber, two opposite inner walls of the first receiving chamber respectively define a notch, a first shaft is assembled in the notch, the second end of the hinge bar rotatably connects to the first shaft.

5. The electronic device as claimed in claim 4, wherein the first housing further defines a second receiving chamber communicating with the first receiving chamber, a positioning post is fixed in the second receiving chamber, the slide mechanism rotatably connects the positioning post.

6. The electronic device as claimed in claim 1, wherein the guiding slot defines an opening end, the positioning block slides out of the guiding slot by the opening end.

7. The electronic device as claimed in claim 6, wherein the guiding slot and the positioning block are T-shaped.

8. The electronic device as claimed in claim 1, wherein the hinge bar comprises a second fixed portion positioned thereon, a first fixed portion is fixed on the sliding plate; two ends of the resilient element are secured to the first fixed portion and the second fixed portion.

9. The electronic device as claimed in claim 1, wherein the sliding plate comprises two protruding blocks and a second shaft spanned between the protruding blocks; the first end of the hinge bar rotatably connect the second shaft.

10. An electronic device comprising:
a first housing comprising at least one positioning block;
a second housing covering the first housing, the second housing comprising a first edge and an opposite second edge and further defining at least one guiding slot, the at least one positioning block slidably received in the at least one guiding slot;

a slide mechanism assembled in the second housing and rotatably connecting the first housing;

a hinge bar, a first end of the hinge bar rotatably connecting to the slide mechanism, a second end of the hinge bar rotatably and slidably connecting to the first housing; and a resilient element respectively fixed on the slide mechanism and the hinge bar;

wherein when the second housing overlaps the first housing, the resilient element is compressed to define an obtuse angle between the hinge bar and the slide mechanism; when the second housing is open relative to the second housing, the resilient element drives the hinge bar and the slide mechanism rotated relative to the first housing and approached to each other to define an acute angle, the hinge bar and the slide mechanism support the second housing.

11. The electronic device as claimed in claim 10, wherein the guiding slot defines an opening end, the positioning block slides out of the guiding slot by the opening end.

12. The electronic device as claimed in claim 11, wherein the guiding slot and the positioning block are T-shaped.

13. The electronic device as claimed in claim 10, wherein the slide mechanism comprises a fixed plate and a sliding plate sliding on the fixed plate; the fixed plate is fixed on the second housing, the first end of the hinge bar rotatably connects the sliding plate.

14. The electronic device as claimed in claim 10, wherein the first housing defines a first receiving chamber, two opposite inner walls of the first receiving chamber respectively define a notch, a first shaft is assembled in the notch, the second end of the hinge bar rotatably connects to the first shaft.

15. The electronic device as claimed in claim 14, wherein the first housing further defines a second receiving chamber communicating with the first receiving chamber, a positioning post is fixed in the second receiving chamber, the slide mechanism rotatably connects the positioning post.

* * * * *